United States Patent
Adragna et al.

(10) Patent No.: US 7,307,405 B2
(45) Date of Patent: *Dec. 11, 2007

(54) TRANSITION MODE OPERATING DEVICE FOR THE CORRECTION OF THE POWER FACTOR IN SWITCHING POWER SUPPLY UNITS

(75) Inventors: Claudio Adragna, Monza (IT); Ugo Moriconi, Dalmine (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 302 days.

This patent is subject to a terminal disclaimer.

(21) Appl. No.: 11/083,445

(22) Filed: Mar. 18, 2005

(65) Prior Publication Data

US 2005/0207187 A1    Sep. 22, 2005

(30) Foreign Application Priority Data

Mar. 22, 2004    (EP)    ................... 04425199

(51) Int. Cl.
    *G05F 1/70*    (2006.01)
(52) U.S. Cl. ................. 323/207; 323/222; 323/285
(58) Field of Classification Search ............ 363/13, 363/15, 19, 20, 21.04, 21.1, 21.11, 21.12, 363/21.18, 25, 26, 28, 30; 323/205, 207, 323/210–211, 222–223, 282, 284–285, 290
    See application file for complete search history.

(56) References Cited

U.S. PATENT DOCUMENTS

| | | | | |
|---|---|---|---|---|
| 5,644,214 A | * | 7/1997 | Lee ........................... | 323/211 |
| 6,175,218 B1 | * | 1/2001 | Choi et al. ................... | 323/222 |
| 6,259,614 B1 | * | 7/2001 | Ribarich et al. .............. | 363/89 |
| 6,946,819 B2 | * | 9/2005 | Fagnani et al. ............. | 323/207 |
| 6,984,963 B2 | * | 1/2006 | Pidutti et al. ............... | 323/207 |
| 7,064,527 B2 | * | 6/2006 | Adragna ..................... | 323/207 |

FOREIGN PATENT DOCUMENTS

EP    1 387 476 A    2/2004

OTHER PUBLICATIONS

Adragna; "Nicht Mehr Als Noetig Stabilisierung Eines Im Transition Mode Arbeitenden PFC-Vorreglers Hilft Strom Sparen"; Elektronik; Jul. 13, 1999; pp. 50-52,54; vol. 48, No. 14; Franzis Verlag GMBH; Munchen, DE.

(Continued)

Primary Examiner—Bao Q. Vu
Assistant Examiner—Stuart Hansen
(74) Attorney, Agent, or Firm—Hogan & Hartson LLP

(57) ABSTRACT

A transition mode operating device for the correction of the power factor in switching power supply units includes a converter for receiving an input voltage and for providing a regulated output voltage, and a coupled control device. The converter includes a power transistor, a rectifier, and an inductor and auxiliary winding arranged between the rectifier and a power transistor. The control device includes a circuit for generating an error signal, a multiplier for receiving the error signal, and a driving circuit coupled to the multiplier to determine the on time period and the off time period of the power transistor. The control device includes circuitry coupled to the auxiliary winding of the inductor to generate a signal proportional to the input voltage during the on time of said power transistor.

7 Claims, 3 Drawing Sheets

OTHER PUBLICATIONS

Ben-Yakkov, et al. "PWM Converters with Resistive Input"; IEEE Transactions on industrial Electronics; Jun. 1, 1998; pp. 519-520; vol. 45, No. 3; IEEE Inc.; New York.

European Search Report; EP 04 42 5199; STMicroelectronics, S.R.L.; Jun. 29, 2004.

* cited by examiner

TRANSITION MODE OPERATING DEVICE FOR THE CORRECTION OF THE POWER FACTOR IN SWITCHING POWER SUPPLY UNITS

RELATED APPLICATION

The present application claims priority of European Patent Application No. 04425199.9 which is incorporated herein in its entirety by this reference.

BACKGROUND OF THE INVENTION

The present invention refers to a transition mode operating device for the correction of the power factor in switching power supply units.

These devices are generally used for the active correction of the power factor (PFC) for switching power supply units used in common electronic appliances such as computers, televisions, monitors, etc and to power fluorescent lamps, in other words pre-regulation stages with forced switching which have the task of absorbing from the network supply a current that is virtually sinusoidal and is in phase with the network voltage. A switching power supply unit of the present type therefore comprises a PFC and a DC-DC converter connected to the PFC output.

A switching power supply unit of the typical type comprises a DC-DC converter and an input stage connected to the electric energy distribution network, consisting of a full-wave diode rectifier bridge and of a capacitor connected immediately downstream so as to produce a non-regulated direct voltage from the network alternating sinusoidal current. The capacitor has sufficiently large capacitance because at the terminals thereof the AC signal is relatively small compared with the DC level. The bridge rectifier diodes therefore conduct only a small portion of each half cycle of the network voltage because the momentary value of the network voltage is lower than the voltage on the capacitor for most of the cycle. The current absorbed by the network is accordingly a series of narrow pulses the amplitude of which is 5 to 10 times the resulting average value.

This has considerable consequences: the current absorbed from the line has peak and effective values that are much greater than in case of the absorption of sinusoidal current, the network voltage is distorted by the almost simultaneous pulsed absorption of all the appliances connected to the network, in the case of three-phase systems the current in the neutral conductor is greatly increased, and the energy potential of the system for producing electric energy is poorly used. In fact, the wave shape of a pulsed current is very rich in odd harmonic distortions that, while not contributing to the power returned to the load, contribute to increasing the effective current absorbed by the network and therefore to increasing the dissipation of energy.

In quantitative terms this can be expressed both in terms of power factor (PF), defined as the ratio between real power (the power that the power supply unit returns to the load plus the power dissipated inside it in the form of heat) and apparent power (the product of the effective network voltage for the effective absorbed current), and in terms of total harmonic distortion (THD), generally defined as the percentage ratio between energy associated with all the harmonic distortions of a superior order and that associated with the fundamental harmonic distortion. Typically, a power supply unit with a capacitive filter has a PF between 0.4-0.6 and a THD greater than 100%.

A PFC arranged between the rectifier bridge and the input of the DC-DC converter enables an almost sinusoidal current, which is in phase with the voltage, to be absorbed from the network and brings PF close to one and reduces THD.

The PFCs generally comprise a converter provided with a power transistor and an inductor coupled to it and a control device coupled to the converter in such a way as to obtain from a network alternating input voltage a direct voltage regulated at the output. The control device is capable of determining the on time period Ton and the off time period Toff of the power transistor; the total of the period of Ton and the period of Toff time gives the cycle period or switching period of the power transistor.

The commercially available PFC circuit types are basically of two kinds that differ according to the different control technique used: pulse width modulation (PWM) control with fixed frequency wherein current is conducted continuously into an inductor of the power supply unit and a variable frequency PWM control, also known as 'transition mode' (TM) because the inductor current is reset exactly at the end of each switching period. TM control can be operated both by controlling inductor current directly or by controlling the time period Ton. The fixed-frequency control technique provides better performance but uses complex circuit structure whereas TM technique requires a more simple circuit structure. The first technique is generally used with high power levels whilst the second technique is used with medium—low power levels, normally below 200 W.

A PFC pre-regulatory stage of the TM type which comprises a boost converter 20 and a control device 1 is schematically shown in FIG. 1. The boost converter 20 comprises a full-wave diode rectifier bridge 2 with a input network voltage Vin, a capacitor C1 (that is used as a high-frequency filter) with a terminal connected to the diode bridge 2 and the other terminal connected to ground, an inductor L connected to a terminal of the capacitor C1, a MOS power transistor M with the drain terminal connected to a terminal of the inductor L downstream of the latter and having the source terminal connected to a resistance Rs connected to ground, a diode D having the anode connected to the common terminal of the inductor L and the transistor M and the cathode connected to a capacitor Co, having the other terminal connected to ground. The boost converter 20 generates a direct output voltage Vout on the capacitor Co that is greater than the network maximum peak voltage, typically 400 V for systems powered by European network supplies or by a universal supply. Said output voltage Vout is the input voltage of the DC-DC converter connected to the PFC.

The control device 1 has to maintain the output voltage Vout at a constant value by feedback control. The control device 1 comprises an error amplifier 3 suitable for comparing part of the output voltage Vout, in other words the voltage Vr deriving from Vr=R2×Vout/(R2+R1) (where resistances R1 and R2 are connected in series and said series is parallel to the capacitor Co) with a reference voltage Vref, for example 2.5V, and generates an error signal proportional to their difference. The frequency of output voltage Vout is twice that of the network voltage and is superimposed on the direct value. However, if the band amplitude of the error amplifier is significantly reduced (typically to below 20 Hz) by means of a suitable compensation network comprising at least one capacitor and assuming an almost stationary condition operation, in other words with constant effective input voltage and constant output load, the AC component of the output voltage will be greatly attenuated and the error signal will become constant.

The error signal Se is sent to a multiplier 4, where it is multiplied by a signal V1 given by part of the network voltage rectified by the diode bridge 2. At the output of the multiplier 4 there is a signal Sm provided by a rectified sinusoidal current, the amplitude of which obviously depends on the effective network voltage and on the error signal.

The signal Sm is sent to the non-inverting input of a PWM comparator 5 whereas the signal Srs present on the resistance Rs persists on the inverting input. If the signals Srs and Sm are equal, the comparator 5 sends a signal to a control block 6 that drives the transistor M, which in this case switches it off. In this way the output signal Sm of the multiplier determines the peak current of the transistor M and this is then enveloped by a rectified sinusoid.

After the MOS has been switched off the inductor L discharges the energy stored in it onto the load until it is completely emptied. At this point, the diode D does not allow the current to flow and the drain terminal of the transistor MOS continues to float, so that its voltage moves towards the momentary input voltage through resonance oscillations between the parasitic capacitance of the terminal and the inductance of the inductor L. The drain voltage is thus rapidly reduced, said drain voltage being coupled to a terminal to which a zero current detector block 7, which belongs to the block 6, is connected by means of an auxiliary winding of the inductor. This block 7 identifies this negative front, sends a pulsed signal to an OR gate 8, the other input of which is connected to a starter 10 that is suitable for sending a signal to the OR gate 8 at the instant of start time; the output signal S of the OR gate 8 is the set input S of a set-reset flip-flop 11 having another input R that is the output signal of the device 5, it having an output signal Q. The signal Q is sent to the input of a driver 12, which controls the turning on and off of the transistor M.

The control device needs to form the sinusoidal reference for the current and this is performed by means of a resistive divider arranged to the input of the converter; in this way a part of the rectified network voltage is made available to the control device.

However the use of said resistive divider increases the component count of the circuit in the whole and it increases the power dissipation of the same circuit.

PFCs without elements for reading the rectified network voltage belong to the state of the art as the PFC shown in FIG. 2 which is a PFC operating in transition mode with constant turning on time Ton; the elements equal to the PFC in FIG. 1 are represented by the same references and only the differences as regards the PFC in FIG. 1 which refer to the elements and the managing thereof are shown hereinafter.

If it is assumed that the current absorbed by the network from the PFC in almost stationary running conditions (in order words with constant effective input voltage and constant output load) is sinusoidal in each switch-on cycle of the transistor M, the peak current of the inductor L is Ip=Vin× Ton/L, Ton being the time period during which the transistor M is switched on. As the input voltage is sinusoidal, if Ton is kept constant during each network cycle, the peak current of the inductor L is enveloped by a sinusoidal current. An appropriate filter between the network and the input of the rectifier bridge (always present for questions of electromagnetic compatibility) filters the input current, eliminating the high-frequency components, so that the current absorbed from the network is a sinusoidal current of the same frequency and in phase with the network current.

Normally, in PFCs of the TM type controlled in peak-current mode the constancy of switch-on time Ton is a result of forcing the peak current of the inductor to follow a sinusoidal reference. This reference is taken from the rectified voltage after the bridge the amplitude of which is corrected with the error signal coming from the regulating loop of the output voltage, by means of a multiplier block. The constant Ton approach has the advantage that it does not require reading of the input voltage or of a multiplier block.

The error signal Se generated by the error amplifier 3 having a compensation capacitor Ccomp in such case is sent to the inverting input of a PWM comparator 5 whereas at the non-inverting input a ramp signal Sslope persists, which signal is generated by a current generator Ic connected to a VDD supply, a capacitor C and a switch SW. If the signals Se and Sslope are the same the comparator 5 sends a signal to a control block 6 suitable for driving the transistor M, which in this case switches it off. As the error amplifier output is constant the duration of the conduction period of the transistor MOS M is constant within each network cycle. As the load and/or the network voltage conditions vary the error signal changes and sets the Ton value required to regulate the output voltage. As soon as the transistor MOS is switched off SW is closed and C is discharged.

After the transistor MOS is switched off the inductor L discharges the energy stored on the load until it is completely emptied. At this point the diode D does not permit the conduction of current and the drain terminal of the transistor M remains floating, so that its voltage Vdrain moves towards the momentary input voltage by means of resonance oscillations between the parasitic capacity of the terminal and the inductance of the inductor L. The drain voltage Vdrain therefore falls rapidly, being coupled by an auxiliary coil of the inductor L with the terminal to which a zero current detector block 7 is connected which is part of the block 6. This block 7 identifies this negative front, sends a pulsed signal to an OR gate 8, the other input of which is connected to a starter 10 that is suitable for sending a signal to the OR gate 8 at the instant of start time; the output signal S of the gate 8 OR is the set input S of a set-reset flip-flop 11 with another input R that is the output signal to the device 5, it having two output signals, Q and P (the negated Q signal). The signal Q is sent to the input of a driver 12, which in this case commands the renewed switch-on of the transistor M (in other cases it can command it to be switched off), and the signal P in this case commands the opening of the switch SW (in other cases it commands it to be closed) in such a way that the capacitor C can recharge, thereby starting a new switching cycle. In this way the PFC works in transition mode.

The PFC shown in FIG. 2 does not have resistive elements adapted to obtain the reading of the rectified network voltage, however the particular of the approach with constant time period Ton allows its use in appliances with small variations of the network voltage and of the load. In fact if for the PFC in FIG. 1 the input voltage Vin can vary from 88 VAC to 264 VAC and the variation of the output power Pout is between the 1% and the 100% of the output power with a nominal load, for the PFC in FIG. 2 the input voltage Vin can vary of the 20% and the variation of the output power Pout is between the 30% and the 100% of the output power with a nominal load.

In view of the state of the technique described, the object of the present invention is to provide a transition mode operating device for the correction of the power factor in switching power supply units which is usable for a very large range of the input voltage and a very large range of the load.

SUMMARY OF THE INVENTION

According to an embodiment the present invention said object is achieved by means of a transition mode operating device for the correction of the power factor in switching power supply units, comprising a converter and a control device coupled to said converter for obtaining from an input network alternated voltage a regulated voltage at the output terminal, said converter comprising a power transistor, a circuit adapted to rectify said network voltage, an inductor arranged between the rectifier circuit and a non drivable terminal of said power transistor, said device for the correction of the power factor comprising an auxiliary winding of said inductor, said control device comprising first means having in input a first signal proportional to said regulated voltage and a reference signal and being adapted to generate an error signal, a multiplier having in input said error signal and a driving circuit having in input at least a second signal in output from said multiplier and being adapted to determine the on time period and the off time period of said power transistor, characterized in that said control device comprises second means connected with said auxiliary winding of the inductor and adapted to generate at least a third signal proportional to the network voltage during the on time of said power transistor, said third signal being in input to said multiplier for generating the second signal.

BRIEF DESCRIPTION OF THE DRAWINGS

The characteristics and advantages of the present invention will appear evident from the following detailed description of an embodiment thereof, illustrated as non-limiting example in the enclosed drawings, in which.

DETAILED DESCRIPTION

Figure 1:
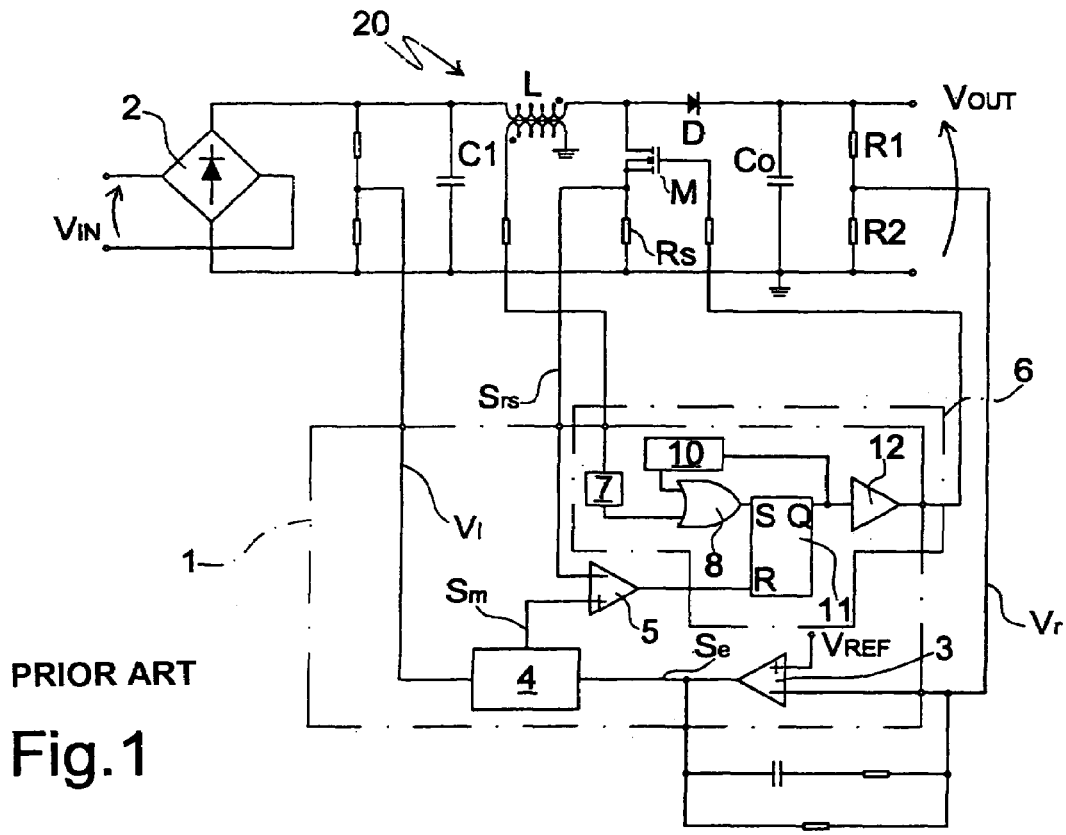
FIG. 1 is a circuit scheme of a PFC operating in transition mode for a switching power supply unit according to prior art.
Figure 2:
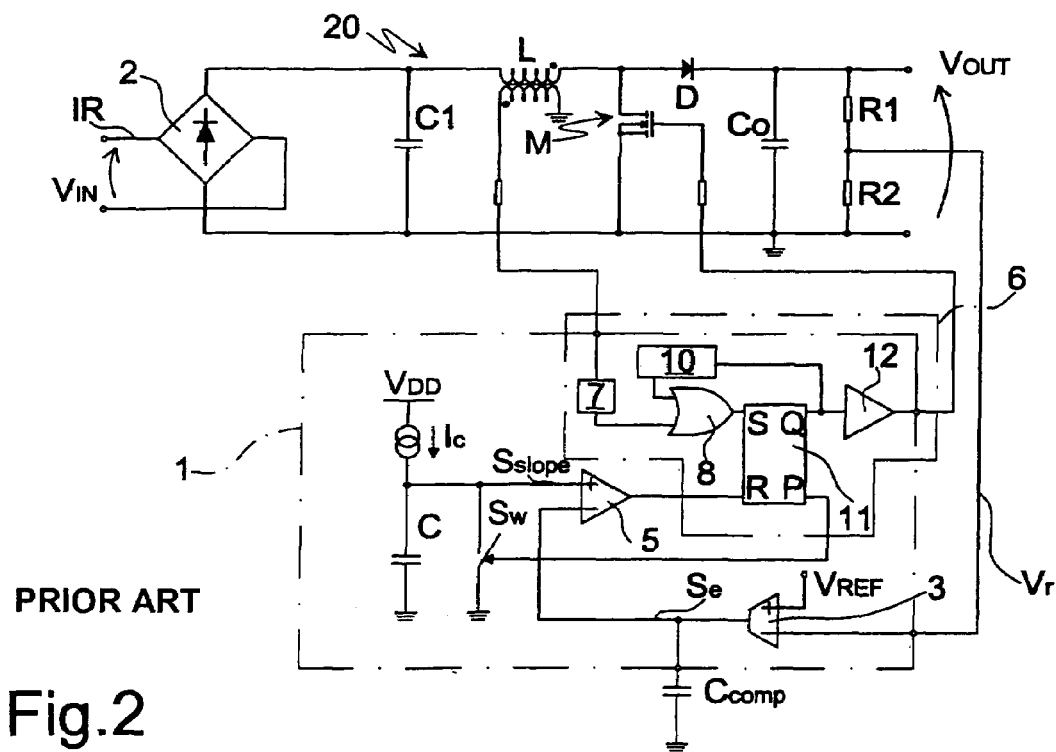
FIG. 2 is a further circuit scheme of a PFC operating in transition mode for a switching power supply unit according to prior art.
Figure 3:
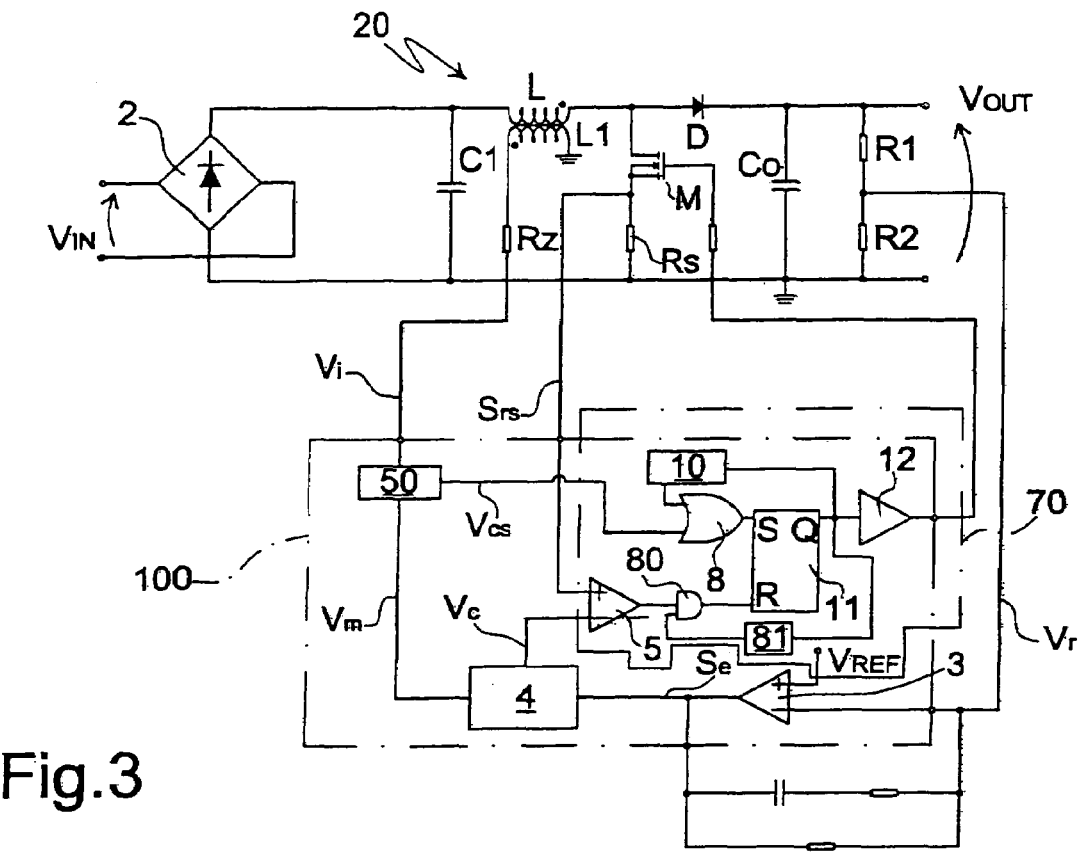
FIG. 3 is a circuit scheme of a PFC operating in transition mode for a switching power supply unit according to present invention.

A PFC device for a switching power supply unit which operates in transition mode according to the present invention is shown in FIG. 3; the elements that are the same as the circuit in FIG. 1 are indicated by the same references. The PFC comprises a boost converter 20 comprising a full-wave diode rectifier bridge 2 that has a network input voltage Vin with a network period Tr, a capacitor C1 that has one terminal connected to the diode bridge 2 and the other terminal connected to ground, an inductor L connected to a terminal of the capacitor C1, a MOS power transistor M with its drain terminal connected to a terminal of the inductor L downstream of the latter, the source terminal being connected to a resistance Rs connected to ground, a diode D with its anode connected with the common terminal of the inductor L and of the transistor M and the cathode connected to a capacitor Co the other terminal of which is grounded. The boost converter generates a direct output voltage Vout that is greater than the network maximum peak voltage, typically 400 V for systems powered by European network or by universal power supplies.

The PFC comprises a control device 100 that has to maintain the output voltage Vout at a constant value by means of feedback control. The control device 100 comprises an error amplifier 3 suitable for comparing part of the output voltage Vout, that is the voltage Vr obtained by Vr=R2×Vout/(R2+R1) (wherein the resistances R1 and R2 are connected in series and the series is connected in parallel to the capacitor Co) with a reference voltage Vref, for example 2.5V, and generates an error signal Se proportional to their difference. The output voltage Vout has AC component, the frequency of which is twice that of the network supply and is superimposed on the direct value. If, however, the amplitude of the error amplifier band is significantly reduced (typically below 20 Hz) by means of a compensation capacitor Ccomp and assuming that operation is almost stationary, in other words with constant effective input voltage and constant output load said AC component is greatly attenuated and the error signal becomes constant.

A signal Vi that is between the terminals of a series composed by a auxiliary winding L1 of the inductor L and a resistance Rz, is sent to the input of a circuit block 50 generating a signal Vm to send to the multiplier 4. The voltage Vi is proportional to the voltage Vin when the transistor M is turned on; in fact the voltage between the terminals of the inductor L with the transistor M turned on is the rectified network voltage and the voltage at the terminals of the auxiliary winding L1 is the same voltage that is reduced by a coil rate. On the base of the polarity of the winding L1 the voltage Vi is a part of the rectified network voltage with a negative value.

The voltage Vm produced by the circuit block 50 is a voltage proportional to the network voltage during the on time period Ton of the transistor M. In fact when the transistor MOS M is turned on a current proportional to Vpk×sin θ (with sin θ between 0 and 1) flows through the inductor L in the case wherein the network voltage is a sinusoidal voltage and where Vpk is the peak value of the network voltage. It occurs Vi=(NL1/NL)×Vpk×sin θ where NL and NL1 are the numbers of the coils present in the inductors L and L1.

Figure 4:
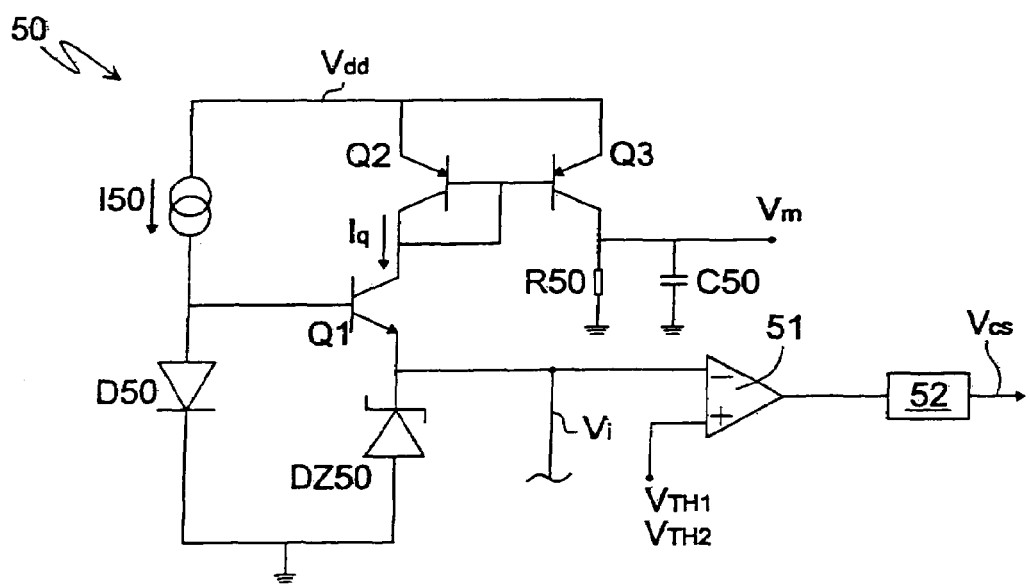
FIG. 4 is a circuit scheme of a block of the PFC in FIG. 3 according to an embodiment of the present invention.

Referring now to FIG. 4 the circuit block 50 sends a signal Vcs to a circuit 70 that drives transistor MOS M. A possible implementation of the circuit block 50 shown in FIG. 4 comprises a current generator I50 having a terminal connected with the supply voltage Vdd and the other terminal connected with the anode of a diode D50 having the cathode connected to ground. The circuit block 50 comprises a npn bipolar transistor Q1 having the base terminal connected with the anode of the diode D50, the emitter terminal connected with the cathode of a Zener diode Dz50, having the anode connected to ground, and the collector terminal connected with a current mirror formed by the pnp bipolar transistors Q2 and Q3 where the transistor Q2 is in diode connection and the collector terminal of the transistor Q3, connected with a resistance R50 having the other terminal connected to ground, represents the output terminal of the circuit at which the voltage Vm is present. The block 50 comprises an hysteresis comparator 51 having the inverting terminal connected to the emitter terminal of the transistor Q1 while the voltages Vth1 and Vth2, which represent the threshold voltages of the hysteresis with Vth2>Vth1, are at the non inverting terminal. The output of the comparator 51 is the input of a monostable multivibrator 52 at the output terminal of which the voltage Vcs is present.

The voltage signal Vi is applied to the emitter terminal of the transistor Q1; the signal Vi, during the off time period of the transistor M, has a positive value overcoming the threshold voltage Vth2 and reaches the voltage level Vz that is the voltage between the terminals of the Zener diode Dz50 and the output signal of the comparator 51 is at a low voltage level.

When the voltage Vi assumes a negative value, the voltage at the emitter terminal of the transistor Q1 goes down until it overcomes the threshold voltage Vth1, that is it goes down under the voltage Vth1; in such case the output of the comparator 51 changes and it passes from a low voltage level to a high voltage level. This activates the multivibrator 52 generating an output pulse. It is possible to observe that if before the value of the voltage at the emitter terminal assumes a negative value lower than the voltage Vth1 and no raising of the voltage over the voltage Vth2 has been verified, the comparator cannot change state and it cannot activate the multivibrator 52. For this reason and for the hysteresis between the voltages Vth1 and Vth2 a managing of the block 50 without disturbances is obtained; each of the voltages Vth1 and Vth2 can have a value lower than the voltage Vz and, for example Vth1=0.7V and Vth2=1.4V.

When the MOS transistor M is turned on the voltage Vi assumes negative values and allows the turning on of the transistor Q1; the last provides a current Iq proportional to the voltage Vi that is Iq=Vi/Rz, which is mirrored by the mirror Q2-Q3 in accordance with prefixed rate k to obtain the output voltage Vm given by K×Iq×R50. The capacitor C50 allows to eliminate the disturbances at high frequency and the resistance R50 is of small value, for example of some kΩ. The information on the input voltage Vin is reformed without reading it directly and this determines a power consumption very lower than the known PFC devices.

The voltage Vm is input to the multiplier 4 the output voltage of which is given by Vc=Km×Vm×(Se−Seo)+Vo where Km is the gain of the multiplier 4, Se is the error signal deriving from the error amplifier 3, Seo is the value of Se which makes null the multiplication, that is it is slightly higher than the low value of the saturation voltage of the output of the error amplifier and Vo is a voltage offset. The voltage Vc is sent to the driving circuitry 70 and, more precisely, to the inverting input of a PWM comparator 5, which belongs to the circuit 70, at the non-inverting input of which a signal Srs is present which derives from the resistance Rs and which is proportional to the momentary current flowing trough the transistor M.

The voltage offset Vo serves to compensate eventual offsets of the PWM comparator 5 because said eventual offsets could bring the output of the comparator 5 at a high voltage level at the starting of each switching cycle when both the signal Vc and the signal Srs are null. Also said voltage offset Vo assumes a relative high value when the voltage Vc is close to null values by forcing the passage of a greater energy and reducing the cross distortion.

The signal Vc is constituted by a series of rectangular pulses the width of which is enveloped by a rectified sinusoid and it depends on the instantaneous network voltage Vin and on the error signal Se.

If the signals Srs and Vc are equal the comparator 5 sends a signal to another block of circuit 70, that is to a set-reset flip-flop 11; the signal Vc is the reset signal of said flip-flop 11. In such a way the transistor M, previously turned on, is turned off and therefore the signal Vc determines the peak current of the transistor M (which coincides with the peak current in the inductor L) and this will be enveloped by a rectified sinusoid.

Since pulse signals are applied to both the inputs of comparator 5, for avoiding undesired turning off of the transistor M which are determined by undesired switching of the comparator 5 which are due, for example, to peaks (spikes) of the signal Srs which can raise said signal over the signal Vi before said signal Vi has reached the final value, a circuit 80-81 can be inserted. The last is formed by an AND gate 80 and a block 81 connected with the output signal Q of the flip-flop 11. The block 81, if the signal Q is high, maintains low its output for a prefixed time. The output of the block 81 and the signal Vc are in input at the AND gate 80 the output of which represents the reset signal of the flip-flop 11.

After the MOS has been switched off the inductor discharges the energy stored in it onto the load until it is completely emptied. At this point, the diode D does not allow the current to flow and the drain terminal of the transistor MOS continues to float, so that its voltage Vdrain moves towards the momentary input voltage through resonance oscillations between the parasitic capacitance of the terminal and the inductance of the inductor L. The drain voltage Vdrain is thus rapidly reduced, said drain voltage Vdrain is coupled with the input terminal of the circuit 50 by means of the auxiliary winding L1 of the inductor L; the block 50 identifies this negative front, sends a pulsed signal Vcs to an OR gate 8, the other input of which is connected to a starter 10 that is suitable for sending a signal to the OR gate 8 at the instant of start time. The output signal of the OR gate 8 is the set input S of the set-reset flip-flop 11. The signal Q is sent to the input of a driver 12 that controls the turning on and off of the transistor M.

Figure 5:
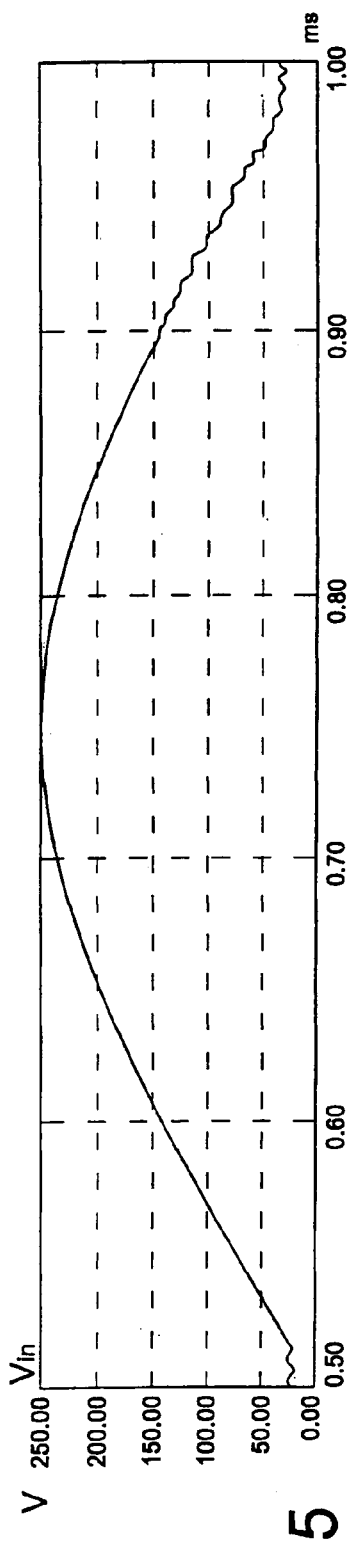
FIGS. 5-7 show time diagrams deriving from simulations on the circuit in FIG. 3.
Figure 6:
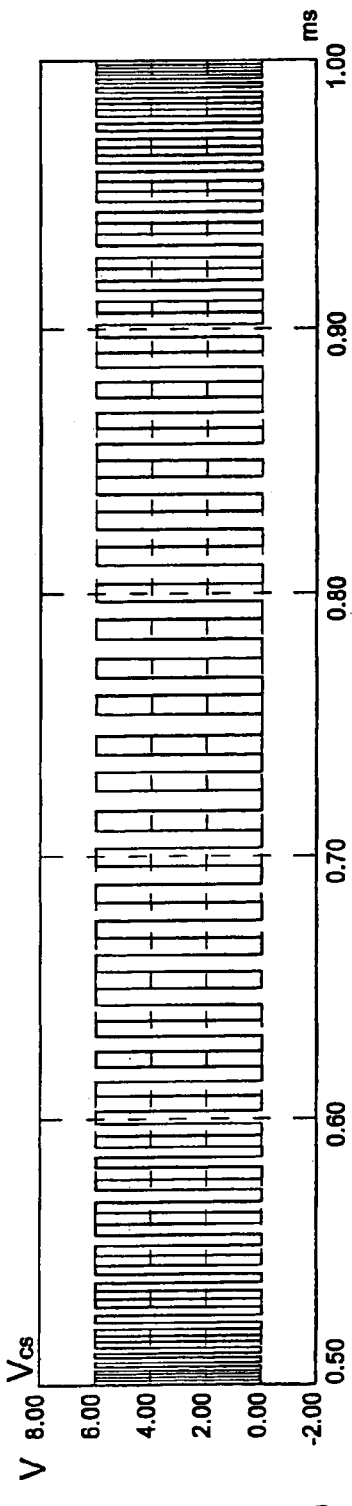
Figure 7:
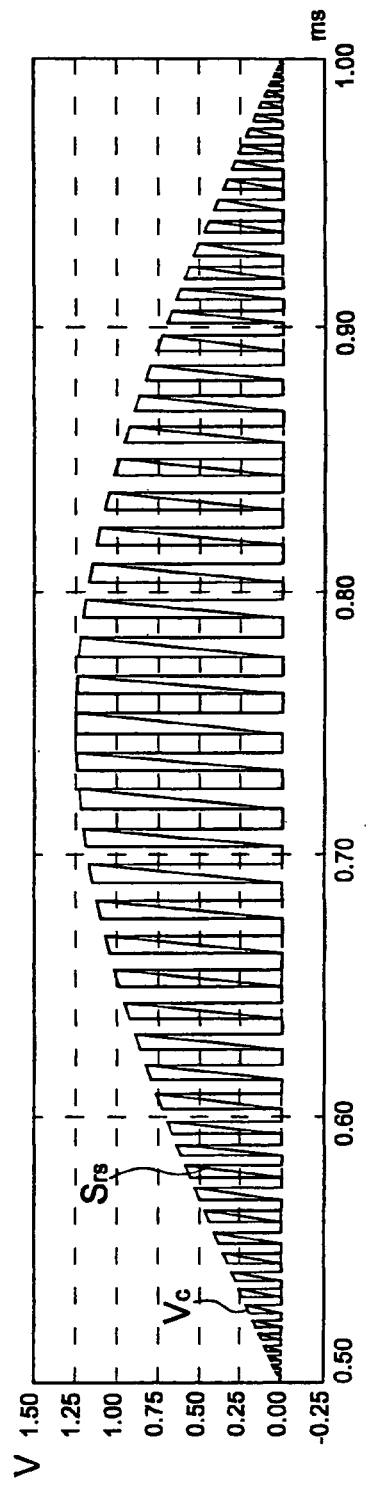

In FIGS. 5-7 the time diagrams of the input voltage Vin (FIG. 5), of the voltage Vcs (FIG. 6) and of the voltage Vc and Srs (FIG. 7) obtained by means of simulations on the circuit in FIG. 3 using as circuit block 50 the circuit scheme in FIG. 4 are shown.

While there have been described above the principles of the present invention in conjunction with specific components, circuitry and bias techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

The invention claimed is:

1. A transition mode operating device for the correction of the power factor in switching power supply units, comprising:
   a converter for receiving an input voltage and providing a regulated output voltage including a power transistor, an inductor arranged between the rectifier circuit and a non-drivable terminal of said power transistor and an auxiliary winding of said inductor; and
   a control device coupled to said converter including,
   first means for receiving a first signal proportional to said regulated output voltage and a reference signal for generating error signal,
   a multiplier for receiving said error signal,
   a driving circuit for receiving a second signal from said multiplier to determine the on time period and the off time period of said power transistor, and
   second means coupled to said auxiliary winding for generating a third signal proportional to the input voltage during the on time of said power transistor, said third signal being received by said multiplier for generating said second signal.

2. The device according to claim 1, wherein said second means provides a further output signal directly to said driving circuit, said further output signal being representative of the passage through zero of the current flowing through said auxiliary winding.

3. The device according to claim 2, wherein said driving circuit comprises a comparator to compare said second signal with a signal, representative of the current flowing trough the power transistor and to produce an output signal when the signals to compare are equal, and a set-reset flip-flop a reset signal of which is the output signal of the comparator and a set signal of which is the further signal produced by said second means, and an output signal of said flip-flop acts upon a drivable terminal of said power transistor.

4. The device according to claim 2, wherein said second means comprise an hysteresis comparator and a monostable multivibrator, said hysteresis comparator having at least one input coupled to the auxiliary winding of the inductor and the output coupled to the input of said monostable multivibrator, said hysteresis comparator providing an output signal to activate said monostable multivibrator if the signal from said auxiliary winding is lower than a further reference signal, the output signal of said monostable multivibrator being said further signal representative of the passage trough zero of the current flowing through said auxiliary winding.

5. The device according to claim 3, further comprising a circuit block and an AND gate for receiving the output signal of the comparator and the output coupled to the reset input of said set-rest flip-flop, the circuit block receiving the output signal of said set-rest flip-flop and the output being received by said AND gate to maintain its output at a low voltage level for a prefixed time.

6. The device according to claim 1, wherein said second means comprises third means to detect the current signal present in said auxiliary winding, fourth means adapted to mirror said current signal at a prefixed rate, and an element to produce said third signal using said mirrored current signal.

7. A transition mode operating device for the correction of the power factor in switching power supply units, comprising:
   a converter for receiving an input voltage and providing a regulated output voltage comprising a power transistor, a rectifier, an inductor arranged between the rectifier circuit and a non-drivable terminal of said power transistor, and an auxiliary winding of said inductor; and
   a control device coupled to said converter including
   a first circuit for receiving a first signal proportional to said regulated output voltage and a reference signal for generating an error signal,
   a multiplier for receiving said error signal,
   a driving circuit for receiving a second signal from said multiplier to determine the on time period and the off time period of said power transistor, and
   a second circuit coupled to said auxiliary winding for generating a third signal proportional to the input voltage during the on time of said power transistor, said third signal being received by said multiplier for generating said second signal.

* * * * *